US011784829B1

(12) United States Patent
Glennon

(10) Patent No.: US 11,784,829 B1
(45) Date of Patent: Oct. 10, 2023

(54) PHYTOSANITARY TREATMENT BLOCKCHAIN

(71) Applicant: Dennis John Glennon, Warwick, RI (US)

(72) Inventor: Dennis John Glennon, Warwick, RI (US)

( * ) Notice: Subject to any disclaimer, the term of this patent is extended or adjusted under 35 U.S.C. 154(b) by 0 days.

(21) Appl. No.: 17/847,402

(22) Filed: Jun. 23, 2022

Related U.S. Application Data

(63) Continuation of application No. 16/739,183, filed on Jan. 10, 2020, now Pat. No. 11,397,536.

(60) Provisional application No. 62/929,391, filed on Nov. 1, 2019, provisional application No. 62/839,832, filed on Apr. 29, 2019.

(51) Int. Cl.
| | |
|---|---|
| *H04L 29/06* | (2006.01) |
| *H04L 9/32* | (2006.01) |
| *H04L 9/06* | (2006.01) |
| *G06F 3/06* | (2006.01) |
| *H04L 9/00* | (2022.01) |

(52) U.S. Cl.
CPC .......... *H04L 9/3265* (2013.01); *G06F 3/0679* (2013.01); *H04L 9/0643* (2013.01); *H04L 9/3247* (2013.01); *H04L 9/50* (2022.05)

(58) Field of Classification Search
CPC ...... G06F 3/0647; G06F 3/061; G06F 3/0679; G06F 12/0802; G06F 2212/401; G06F 3/0656; G06F 3/067; G06F 12/023; H04L 9/0643; H04L 9/3247; H04L 9/3265; H04L 9/50; H04L 9/3239; H04L 9/3297
See application file for complete search history.

(56) References Cited

U.S. PATENT DOCUMENTS

| | | | |
|---|---|---|---|
| 10,491,608 B1* | 11/2019 | Tatge | H04L 63/0492 |
| 2009/0231110 A1* | 9/2009 | Hyde | A01G 9/006 |
| | | | 340/10.41 |
| 2020/0053957 A1* | 2/2020 | Rabby | G06Q 50/02 |
| 2020/0311666 A1* | 10/2020 | Gray | H04W 4/40 |
| 2021/0270520 A1* | 9/2021 | Yang | F25D 29/003 |

(Continued)

OTHER PUBLICATIONS

Hong, Weigbin, et al. "An agri-product traceability system based on iot and blockchain technology." 2018 1st IEEE International Conference on Hot Information-Centric Networking (HotICN). IEEE, 2018. (Year: 2018).*

*Primary Examiner* — Ka Shan Choy
(74) *Attorney, Agent, or Firm* — Anderson Gorecki LLP

(57) ABSTRACT

A phytosanitary treatment blockchain is generated from automatically gathered phytosanitary treatment records. The phytosanitary treatment records are generated by matching authenticated treatment data with authenticated identification data. Matching may be based on geolocation, timestamps, or both. Authentication may be based on digital signatures using private key encryption. Separate treatment sensors and identification sensors automatically gather information about a phytosanitary treatment and the item being treated. The gathered information is encrypted and transmitted to blockchain members that perform authentication, matching, and generation of the phytosanitary treatment blockchain. A tracking code may be issued for each treatment. The tracking code is used to obtain an authentication of the treatment that indicates whether the treatment passed or failed.

20 Claims, 9 Drawing Sheets

(56) References Cited

U.S. PATENT DOCUMENTS

2021/0365434 A1\* 11/2021 Kim .................... G06F 16/2365
2022/0303125 A1\* 9/2022 Enkhtaivan ........... H04L 9/3247

\* cited by examiner

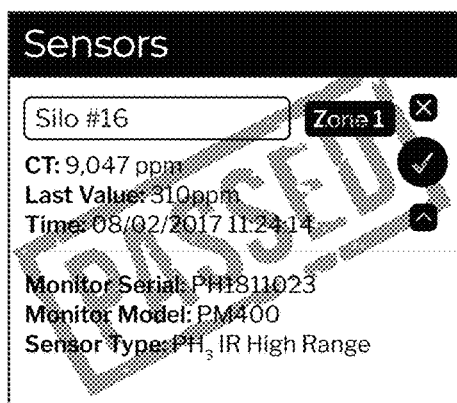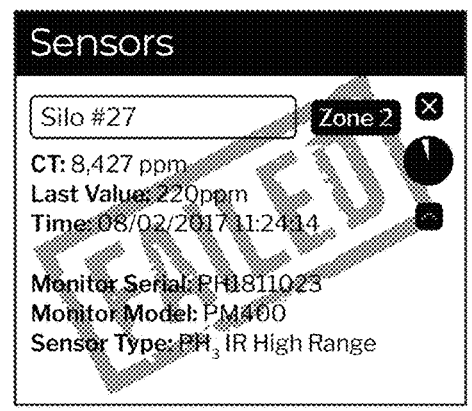
Figure 6A                    Figure 6B

PHYTOSANITARY TREATMENT BLOCKCHAIN

TECHNICAL FIELD

The subject matter of this disclosure is generally related to phytosanitary treatments, and more particularly to creation and management of reliable phytosanitary treatment records.

BACKGROUND

International trade is a primary cause of new introductions of invasive alien species such as the Asian Longhorned Beetle (*Anoplophora glabripennis*) and Brown Marmorated Stink Bug (*Halyomorpha halys*). The rates of new introductions increased steeply after 1950, and more than a third of all first introductions occurred between 1970 and 2014. The International Union for Conservation of Nature (IUCN) currently lists 357 invasive alien species that seriously threaten native ecosystems.

Fumigation and heat treatment are well-established practices for the prevention of spread of invasive species through agricultural products and wood packaging. However, new introductions have increased due to the combination of trade growth and inconsistent and unreliable treatment practices. International Standards for Phytosanitary Measures No. 15 (ISPM-15) was developed by the International Plant Protection Convention (IPPC) for treatment of wood and packaging material made of wood, both of which are recognized pathways for the introduction and spread of pests. According to ISPM-15, all solid wood and wood packaging material (WPM) over 6 mm in thickness used for export, such as wooden pallets, dunnage, and crating, must be treated. An ISPM-15 compliant heat treatment process requires heating to an internal temperature of 56 degrees Celsius or more for at least 30 minutes. The United States Department of Agriculture's Animal and Plant Health Inspection Service (APHIS) has a Memorandum of Understanding with the American Lumber Standard Committee (ALSC) for compliance with ISPM-15. However, the integrity of the program is dependent upon self-regulation by industry and can be easily circumvented due to inadequate regulatory oversight and dependence on paper documentation. Similar problems exist with fumigation programs.

SUMMARY

All examples, aspects and features mentioned in this document can be combined in any technically possible way.

In accordance with some aspects an apparatus comprises: at least one treatment sensor that detects and stores measurements of environmental conditions associated with a phytosanitary treatment; at least one identification sensor that detects and stores information that identifies an item undergoing the phytosanitary treatment; and a plurality of block-chain members that maintain a blockchain of phytosanitary treatment records, including a phytosanitary treatment record generated from the detected measurements of environmental conditions associated with the phytosanitary treatment and the detected information that identifies the item undergoing the phytosanitary treatment.

In accordance with some aspects a method comprises: detecting and storing measurements of environmental conditions associated with a phytosanitary treatment; detecting and storing information that identifies an item undergoing the phytosanitary treatment; and maintaining a blockchain of phytosanitary treatment records, including a phytosanitary treatment record generated from the detected measurements of environmental conditions associated with the phytosanitary treatment and the detected information that identifies the item undergoing the phytosanitary treatment.

Advantages that may be associated with some implementations include improved reliability due to automatic data capture and associated use of a blockchain to maintain phytosanitary treatment records. Manually collected data, e.g. recorded on paper, is easily lost, corrupted, or forged. Further, paper records are not conducive to computerized analysis and are time-consuming to retrieve. Automated data collection helps to avoid data corruption due to human error and laziness. Further, a phytosanitary treatment blockchain is much more difficult to lose, forge, or alter than paper records.

BRIEF DESCRIPTION OF THE FIGURES

FIGS. 5, 6A, 6B, 7, and 8 illustrate authentication information via a graphical user interface.

DETAILED DESCRIPTION

Aspects of the invention will be described and illustrated in the context of phytosanitary fumigation and heat treatment records. However, the invention is not limited to phytosanitary treatments. Further, the invention is not limited to fumigation and heat treatments.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

Figure 1:
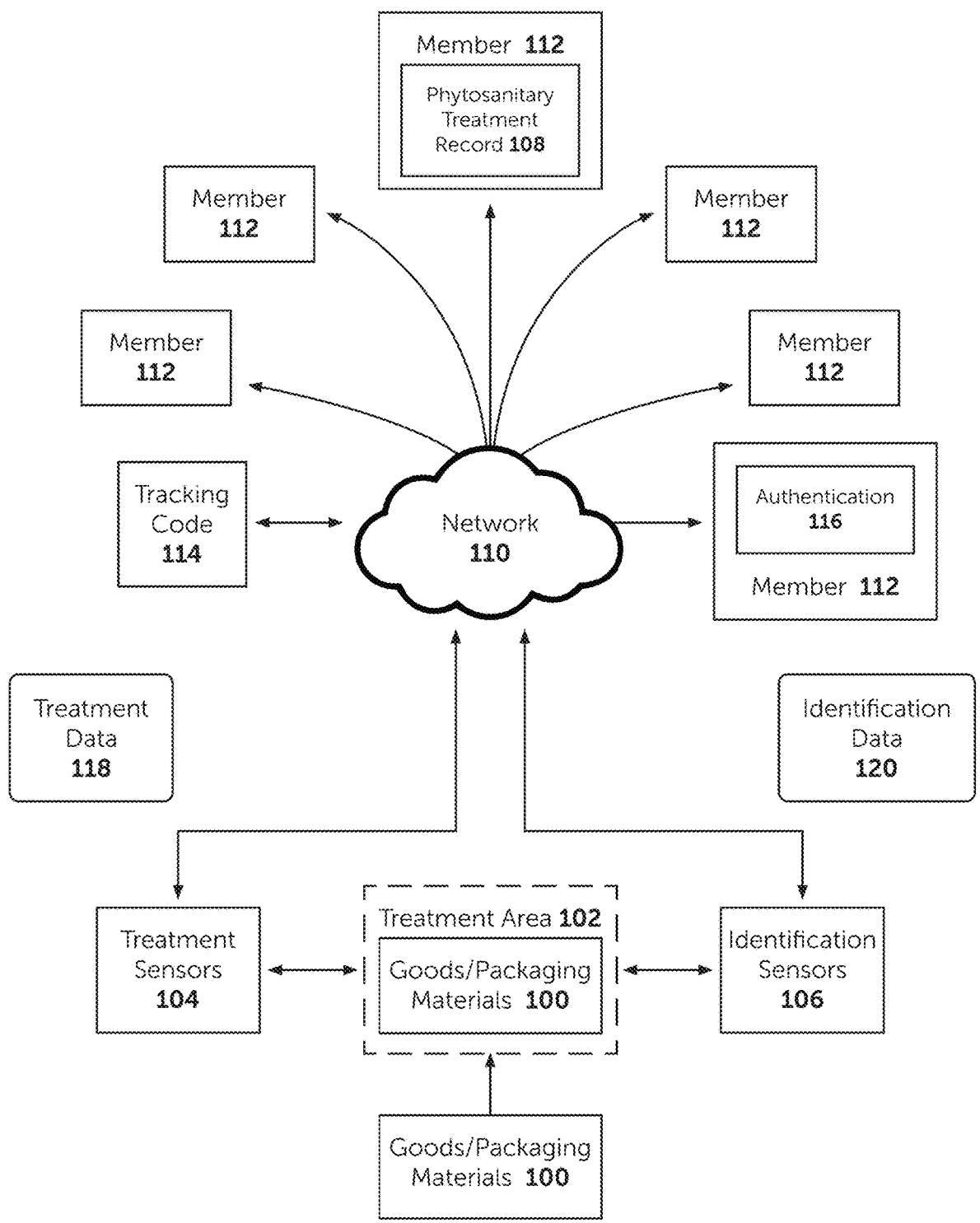
FIG. 1 is a block diagram of a system for automatically creating block-chained phytosanitary records.

FIG. 1 is a block diagram of a system for automatically creating block-chained phytosanitary records. The system includes treatment sensors 104, identification sensors 106, and multiple blockchain members 112. The treatment sensors and identifications sensors include at least one sensor component, processor, memory, power source, and a wired network interface or wireless transceiver. In some implementations the treatment sensors and identification sensors are implemented using mobile computing devices such as mobile phones, notepad computers, or tablet computers. The blockchain members are computing devices such as servers, storage arrays, cloud storage gateways, data centers, or other types of computing nodes.

Phytosanitary record generation may begin when an item being treated such as goods/packaging materials 100 is moved into a treatment area 102. The goods/packaging materials may include a wide variety of agricultural and non-agricultural products and/or wood or WPM. The treatment area 102 may be located anywhere in the distribution chain from a point of origin such as a farm to a destination such as a food retailer. Within the treatment area 102, the goods/packaging materials 100 are subjected to a phytosanitary treatment such as fumigation or heat to kill pests and invasive alien species in accordance with any of various protocols and programs for fumigation and heat treatment that are known in the art.

The treatment sensors 104, which may be located inside or outside the treatment area 102, measure and record characteristic aspects of the phytosanitary treatment process. Examples of characteristic aspects that may be measured and recorded include, but are not limited to, one or more of treatment start time (time of day and date), treatment end time (time of day and date), geographic location where the measurements are taken (e.g., global positioning system coordinates), concentration of fumigant at treatment start time, concentration of fumigant at treatment end time, concentration of fumigant at recorded times between the start time and the end time, temperature of the treatment area or goods/packaging materials at treatment start time, temperature of the treatment area or goods/packaging materials at treatment end time, and temperatures of the treatment area or goods/packaging materials at recorded times between the start time and the end time. The recorded characteristic aspects of the treatment are transmitted to the blockchain members 112 as treatment data 118. The treatment data 118 may be encrypted before transmission, e.g. using private key cryptography.

The identification sensors 106 sense and record identifying characteristics of the goods/packaging materials 100 being treated. For example, the identification sensors may sense and record a unique ID associated with the goods/packaging materials or a container in which the goods/packaging materials are being transported. The identification sensors may independently determine and record the geographic location at which the identifying characteristics are recorded. Further, the identification sensors may independently timestamp the recorded data, e.g. with the time of day and date when the identifying characteristics are sensed and recorded. The identifying characteristics of the goods/packaging materials are transmitted to blockchain members 112 as identification data 120. The identification data 120 may be encrypted before transmission using private key cryptography.

Various aspects of generation of the treatment data and the identification data may be automated. For example, the treatment data 118 and the identification data 120 may be created without reliance on information recorded on paper. Electromechanical, electronic, optical, or other types of sensors may record machine-readable measurements and information that are used to create the treatment data 118 and identification data 120. In some implementations the treatment data 118 and the identification data 120 are created without reliance on any manually recorded information. For example, operation of the treatment sensors and identification sensors may be fully automated such that the treatment data 118 and identification data 120 are generated without need for a human to manually initiate new measurements for each new item of goods/packaging materials that is moved into the treatment area and treated. The treatment sensors may automatically detect treatment start and stop based on temperature or fumigant concentration. Further, the identification sensors may automatically detect treatment start and stop each time a new item of goods/packaging materials is moved into and out of the treatment area.

The treatment data is matched and combined with the identification data for a given phytosanitary treatment to create a phytosanitary treatment record 108. The blockchain members 112 each receive the encrypted treatment data 118 and the encrypted identification data 120 for multiple treatments. The blockchain members use a public key or public keys to decrypt the treatment data and identification data. Moreover, private key cryptography may be used to obtain a digital signature from the treatment data and identification data. The decrypted treatment data may be matched with the corresponding decrypted identification data based on one or more of matching timestamps and geographic locations contained therein. The digital signature may be used for primary authentication of the treatment data and identification data. The matching of timestamps and geographic locations contained therein may be used for secondary authentication. The matched and authenticated treatment data and identification data are combined in each member to create an authenticated phytosanitary treatment record 108. Contingent upon agreement between the members on authentication, the phytosanitary treatment record 108 is added to a blockchain of phytosanitary treatment records as will be discussed in greater detail below.

A unique tracking code 114 may be assigned to the phytosanitary treatment record 108, e.g. by the blockchain members. A representation of the tracking code 114 may be physically associated with the goods/packaging materials 100. Examples of tracking code representations include bar and QR codes. The tracking code can be used to electronically obtain an authentication 116 associated with the treatment record 108. The authentication 116, which may be obtained from any member, indicates whether the treatment passed or failed. The authentication may also include information from the treatment record. The authentication may be displayed in a human-readable form using a GUI (graphic user interface) 122 as will be explained below.

Figure 2:
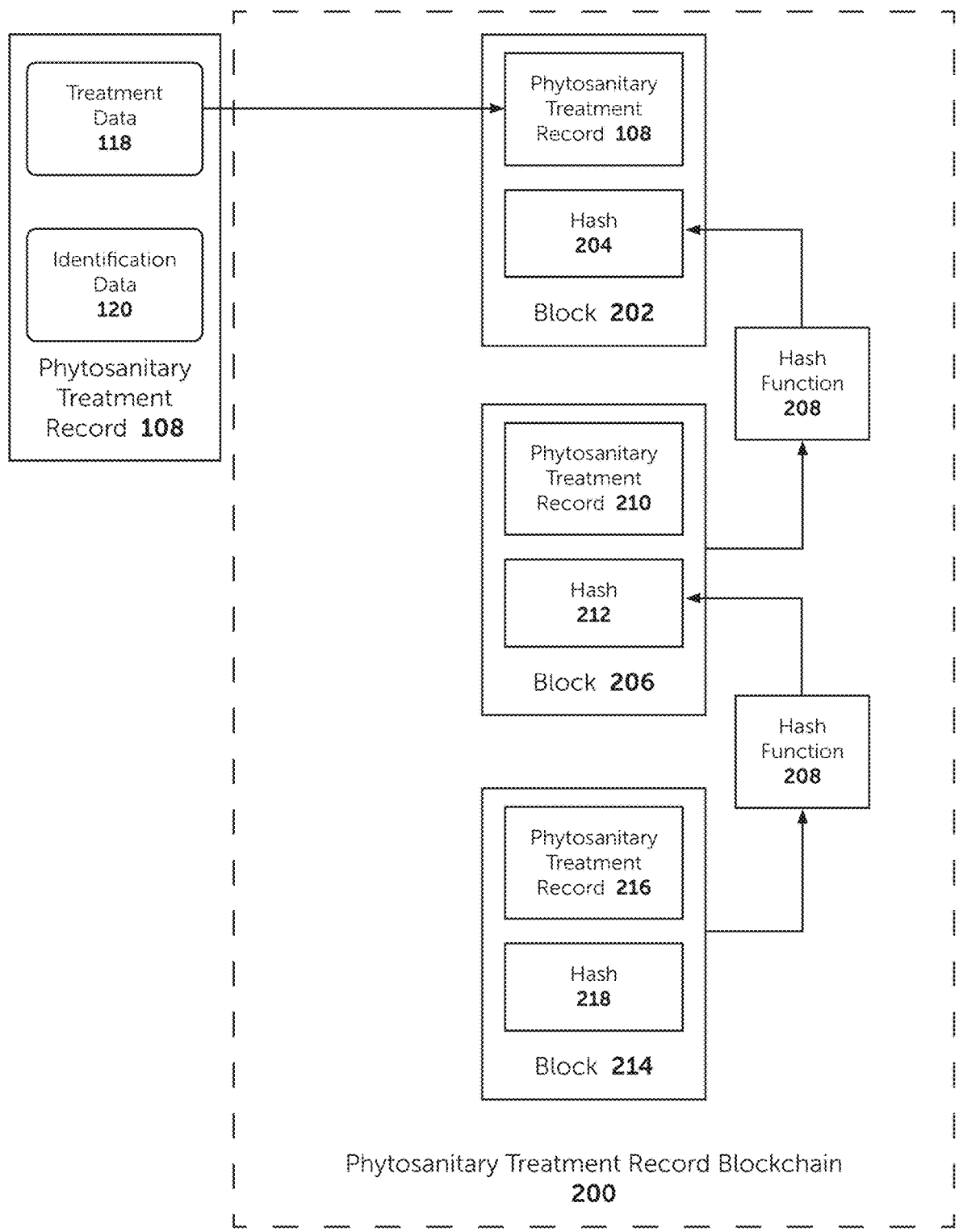
FIG. 2 illustrates generation of a phytosanitary treatment record blockchain.

FIG. 2 illustrates generation of a phytosanitary treatment record blockchain 200. After the treatment data 118 and identification data 120 have been decrypted, authenticated, matched, and combined to create the phytosanitary treatment record 108, the record 108 is used to generate a new block 202. The new block 202 also includes a hash 204 of the previously generated block 206. The hash 204 is generated by processing the previously generated block 206 with a hash function 208. The hash function, as is known in the art, generates a unique fixed length string as a function of the input block. Non-identical blocks do not generate the same hash. The previously generated block 206 includes the previous phytosanitary treatment record 210 and a hash 212 the block 214 that was generated before block 206 using the same hash function 208. Block 214 includes the phytosanitary treatment record 216 generated prior to phytosanitary treatment record 210 and a hash of a prior block (not illustrated). Consequently, the hashes provide a unique relationship between successive blocks, and thus between temporally successive phytosanitary treatment records. The block chain members regularly communicate to validate their copies of the phytosanitary treatment block chain. Changing any phytosanitary treatment record in the blockchain would require all subsequent hashes and blocks to also be changed. Thus, an unauthorized change of a phytosanitary treatment record at one member would be detected and rejected.

Figure 3:
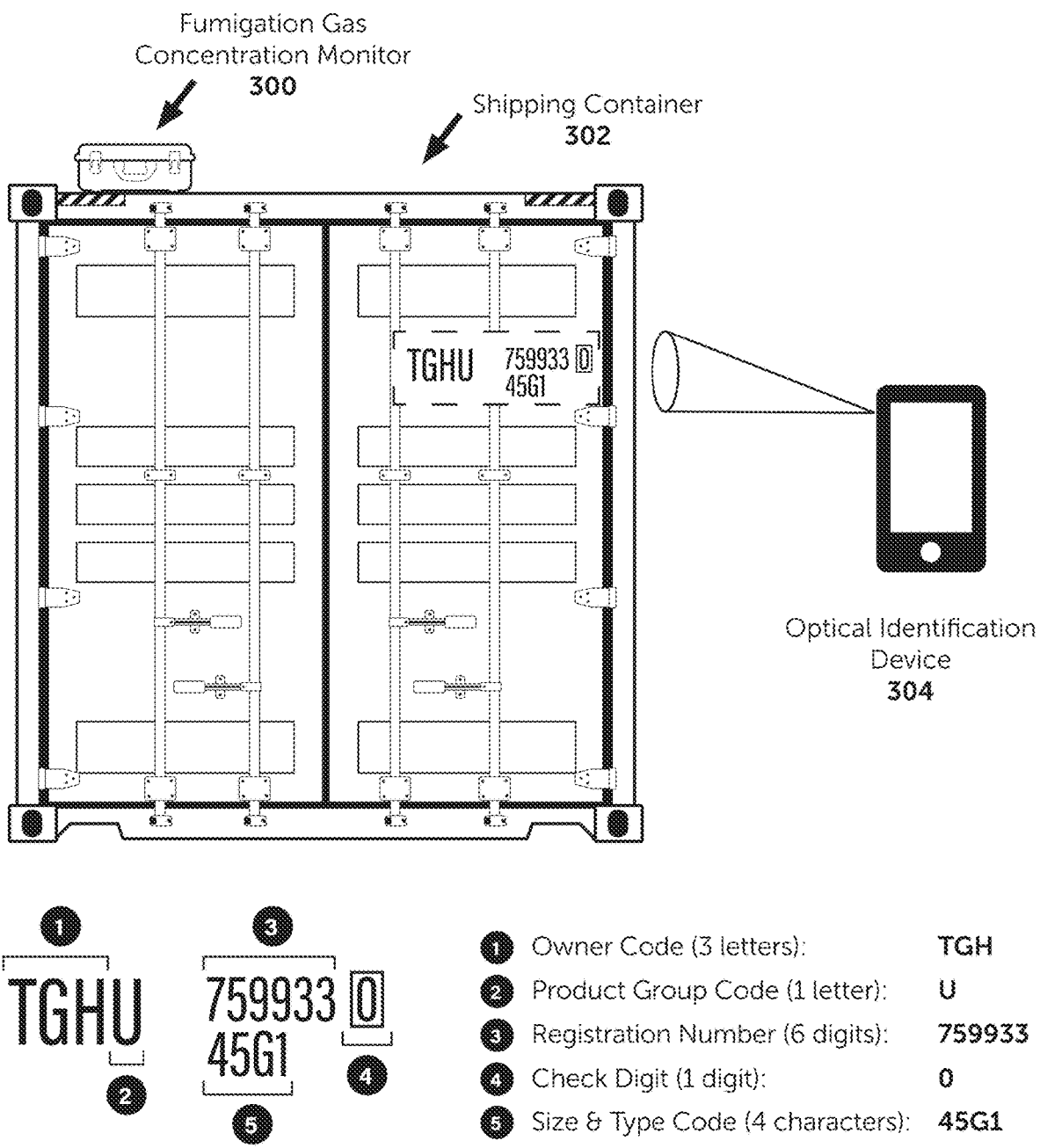
FIG. 3 illustrates automated phytosanitary fumigation treatment and optical identification of goods.

FIG. 3 illustrates automated phytosanitary fumigation treatment and optical identification of goods. A treatment sensor implemented as a fumigation gas concentration monitor 300 is mounted to a shipping container 302, which is the treatment area. The gas concentration monitor includes sensor components that measure the concentration of fumigant gas under control of a program running on a processor. The gas concentration monitor records and timestamps the gas concentration measurements. GPS circuitry may be used to determine geographic coordinates that may be associated with the timestamped measurements, i.e. providing the geolocation at which the measurements were recorded. The timestamped and geolocated gas concentration measurements are encrypted and transmitted to the members as described above, e.g. using wireless communication. The identification sensors are implemented as an optical identification device 304 that includes a camera that captures an image of the shipping container 302 in which the goods/packaging materials are being transported. The image is analyzed to determine identifying characteristics of the shipping container. For example, one or more of the owner code, product group code, registration number, check digit, and size & type code may be detected and recorded. The recorded identifying characteristics are timestamped and associated with geographic coordinates obtained from GPS circuitry of the optical identification device, i.e., independently from the gas concentration monitor. The timestamped and geolocated identifying characteristics are encrypted and sent from the optical identification device to the members, e.g. wirelessly or via a wired communication network.

Figure 4:
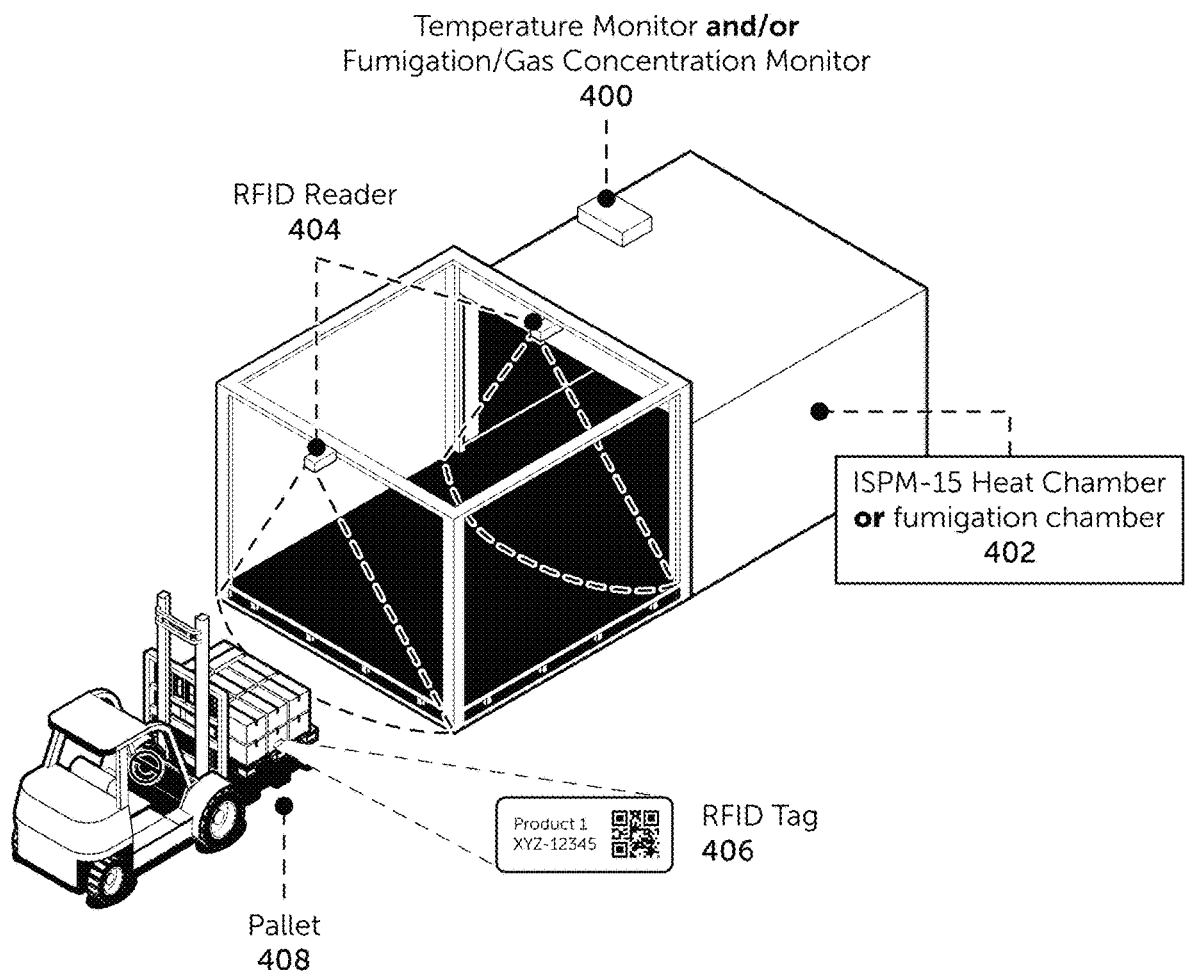
FIG. 4 illustrates automated phytosanitary heat treatment and identification of goods with RFID.
Figure 5:
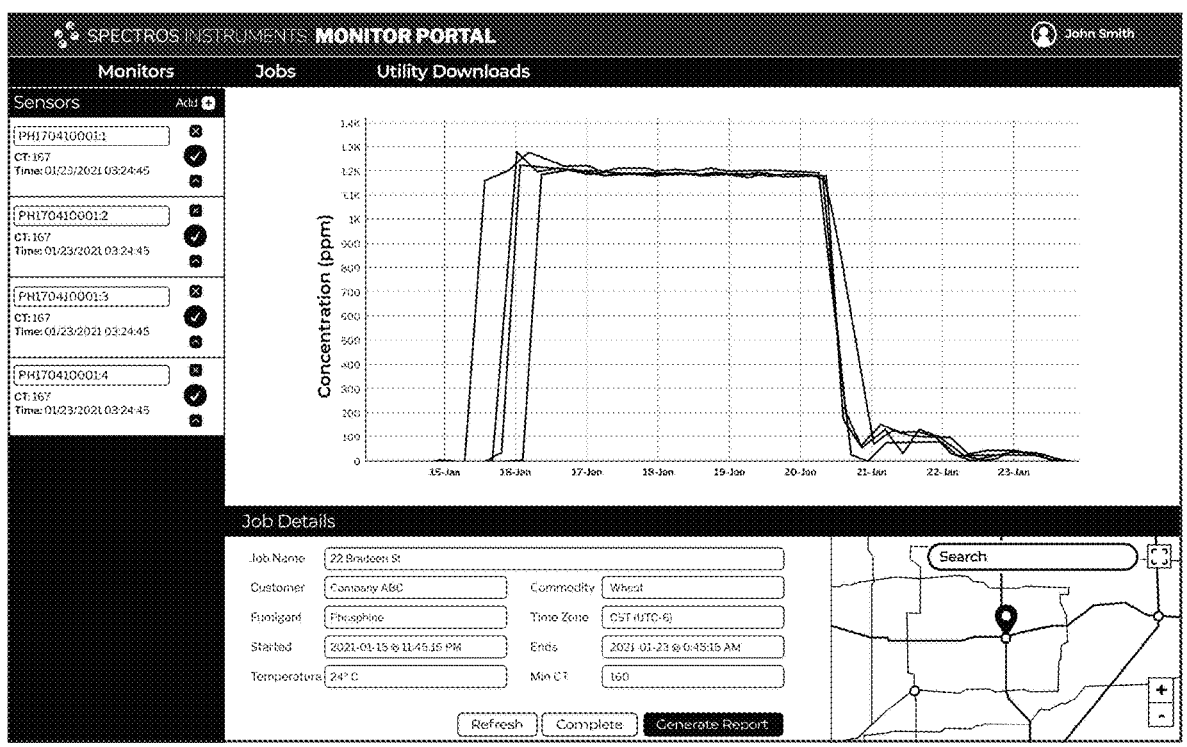
Figure 7:
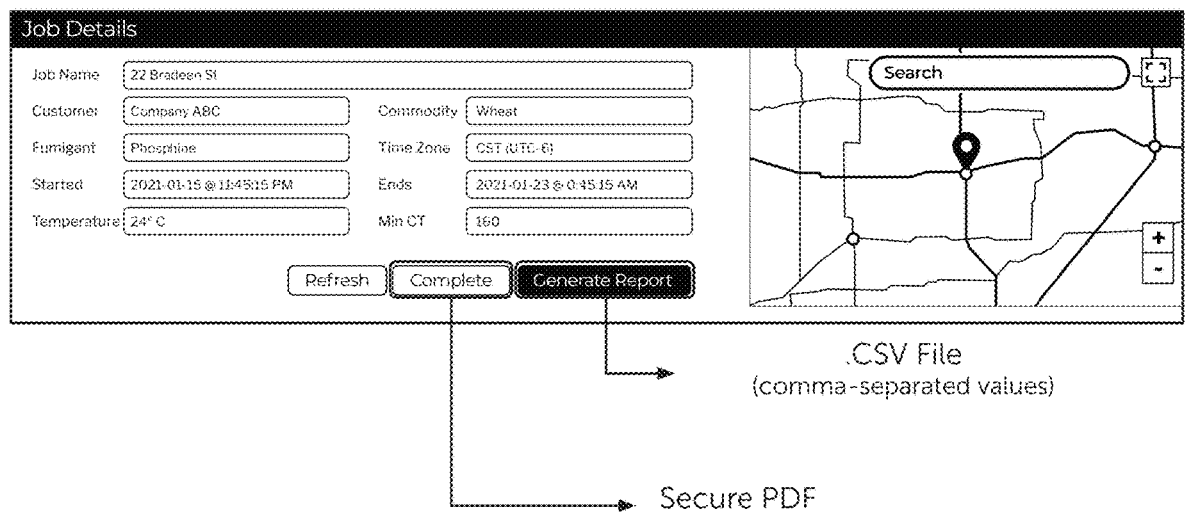
Figure 8:
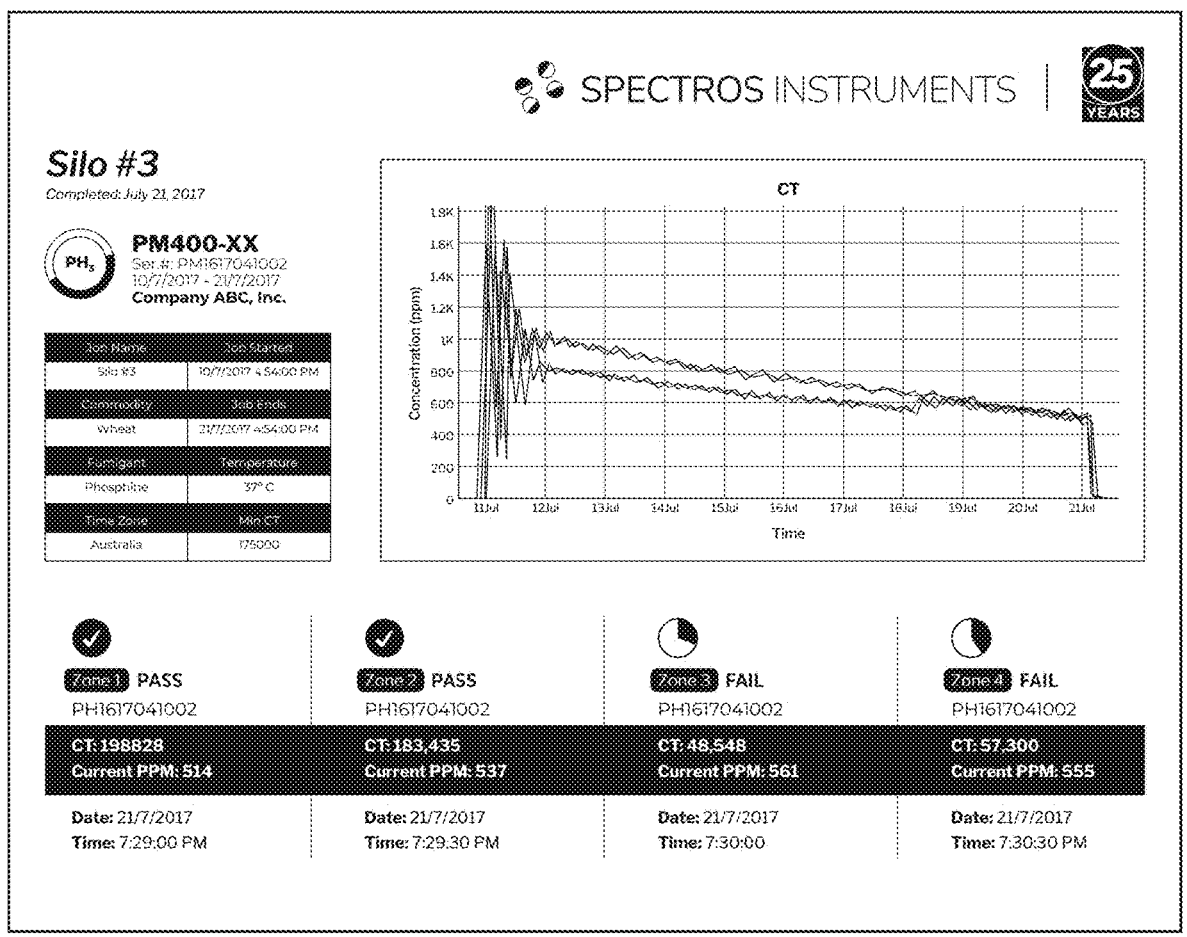

FIG. 4 illustrates automated phytosanitary heat treatment and identification of goods using RFID technology. The treatment sensors are implemented as a temperature monitor and/or fumigation/gas concentration monitor 400 that is mounted to an ISPM-15 heat chamber or fumigation chamber 402, which is the treatment area. The temperature monitor includes temperature sensors that measure the temperature within the chamber 402 under control of a program running on a processor. The temperature monitor records and timestamps the temperature measurements, thereby capturing treatment start time, stop time, and duration. GPS circuitry may be used to determine geographic coordinates that may be associated with the timestamped measurements, i.e. providing the geolocation at which the measurements were recorded. The timestamped and geolocated temperature measurements are encrypted transmitted to the members as described above, e.g. using wireless communication or a wired network. An RFID reader 304 disposed on a portal gateway proximate to the opening of the ISPM-15 heat chamber or fumigation chamber 402 captures information stored in RFID tags such as RFID tag 406 which affixed to the goods/commodities/packaging materials, e.g. a wooden pallet 408. Each pallet may have a RFID tag and unique individual ID. The RFID tag includes identifying characteristics of the goods/packaging materials. The recorded identifying characteristics are timestamped and associated with geographic coordinates obtained from GPS circuitry of the RFID reader, i.e., independently from the temperature monitor. The timestamped and geolocated identifying characteristics are encrypted and sent from the RFID reader to the members.

FIGS. 5, 6A, 6B, 7, and 8 illustrate authentication information obtained in response to a tracking code and presented via a graphical user interface. The interface may present information about individual sensors, e.g., ID, type, and calibration information. Job details such as the identity of the customer, type of fumigant, type of goods/packaging materials treated, and treatment protocol may be presented. The geographic coordinates may be used to retrieve an interactive map and display the location of the treatment. Further, the fumigant concentration over time or temperature over time may be plotted. Measurements from individual sensors may be presented, and an indication of whether the treatment passed or failed may be clearly indicated.

Figure 9:
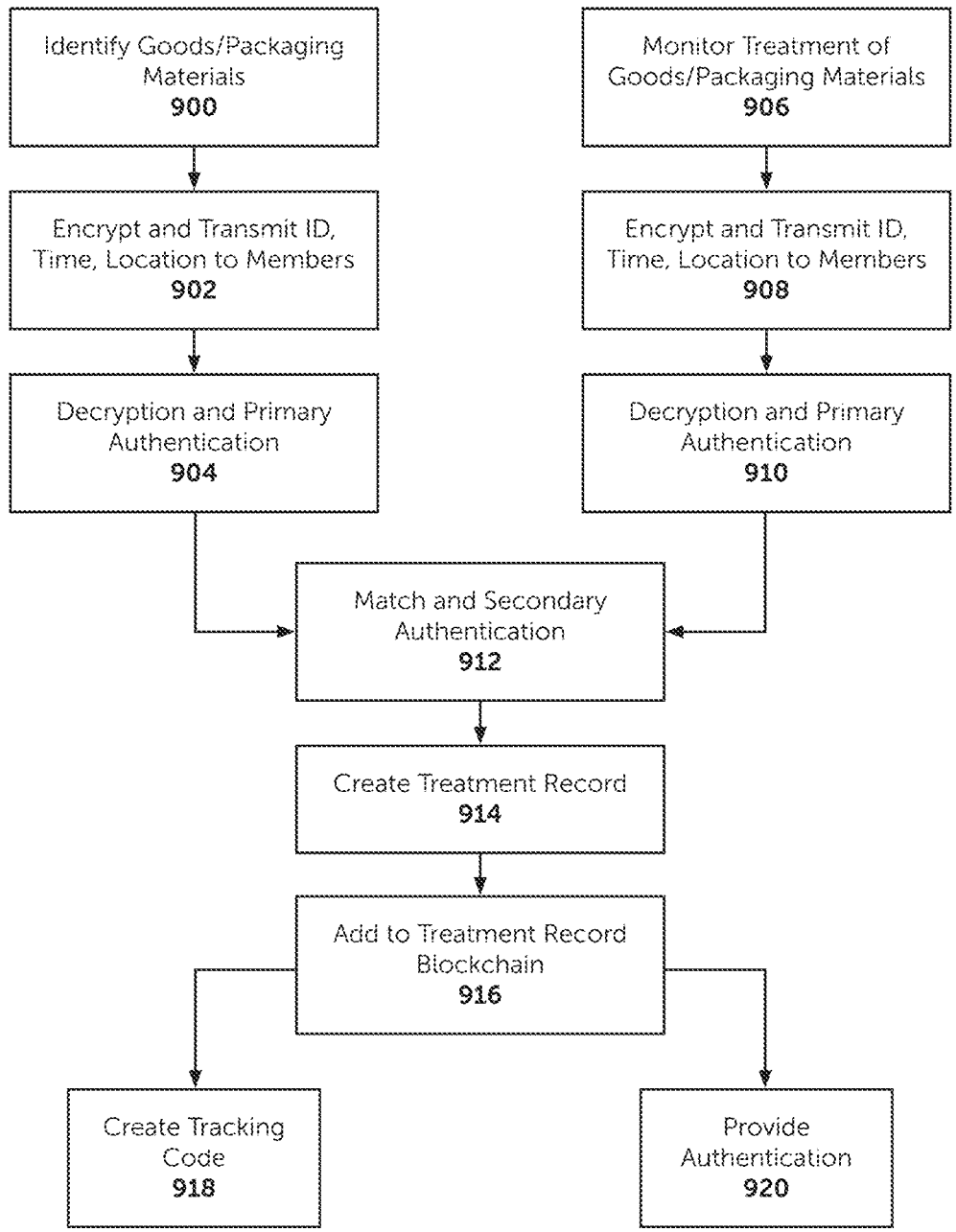
FIG. 9 illustrates a method of creating block-chained phytosanitary records.

FIG. 9 illustrates a method of creating block chained phytosanitary records. The goods/packaging materials are identified as indicated in step 900. As mentioned above, identification may be performed automatically without human intervention. For example, an RFID tag may be scanned with a reader or markings may be read with an optical scanner. The ID is timestamped, combined with location data, encrypted using private key cryptography and a digital signature, and transmitted to member in a message as indicated in step 902. Step 904 is to decrypt the message and use the digital signature for primary authentication using the signature. The treatment of the goods/packaging materials is monitored as indicated in step 906. As mentioned above, treatment monitoring may be performed automatically without human intervention. The recorded treatment data is timestamped, combined with location data, encrypted using private key cryptography and a digital signature, and transmitted to member in a message as indicated in step 908. Step 910 is to decrypt the message and use the digital signature for primary authentication. Steps 900 through 904 may be performed in parallel with steps 906 through 910.

Using the decrypted data, the time and geolocation stamped ID is matched with the time and geolocation stamped treatment data as indicated in step 912. For example, the time and location stamps may be matched. The matching of times and locations may be considered secondary authentication. The authenticated ID and treatment data of the matching records are combined into a fumigation or heat treatment record as indicated in step 914. The treatment record is added to a treatment record blockchain as indicated in step 916. A tracking code for the block-chained treatment record in generated as indicated in step 918. In response to receipt of the tracking record from another node the member provides the authentication as indicated in step 920. The authentication may include some or all the block-chained treatment record.

Several features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
at least one treatment sensor configured to detect measurements of environmental conditions associated with a phytosanitary treatment of a post-harvest agricultural product;
at least one identification sensor configured to detect information that identifies the post-harvest agricultural product; and
a plurality of blockchain members configured to maintain a blockchain of phytosanitary certificates that are treatment records comprising matched pairs of other measurements of environmental conditions associated with other phytosanitary treatments and other identifications of post-harvest agricultural products that were treated, wherein the blockchain members are configured to add to the blockchain a phytosanitary certificate generated from the detected measurements of environmental conditions associated with the phytosanitary treatment of the post-harvest agricultural product and the information that identifies the post-harvest agricultural product.

2. The apparatus of claim 1 wherein the blockchain members are configured to use private key encryption and a digital signature for primary authentication.

3. The apparatus of claim 1 wherein the treatment sensor is configured to associate a timestamp with each detected measurement.

4. The apparatus of claim 1 wherein the treatment sensor is configured to associate a geolocation with each detected measurement.

5. The apparatus of claim 1 wherein the identification sensor is configured to associate a timestamp with the phytosanitary treatment and the information that identifies the post-harvest agricultural product.

6. The apparatus of claim 1 wherein the identification sensor is configured to associate a geolocation with the phytosanitary treatment and the information that identifies the post-harvest agricultural product.

7. The apparatus of claim 1 wherein the treatment sensor and the identification sensor are configured to use private key encryption to send a digital signature and encrypted, timestamped, geolocation-stamped information that identifies the post-harvest agricultural product and the measurements of environmental conditions associated with the phytosanitary treatment, and wherein the blockchain members are configured to use the digital signature for primary authentication.

8. The apparatus of claim 7 wherein the blockchain members are configured to match the information that identifies the post-harvest agricultural product with the measurements of environmental conditions associated with the phytosanitary treatment based on timestamps and geolocation-stamps.

9. The apparatus of claim 8 wherein the blockchain members are configured to create a phytosanitary certificate from the matched information that identifies the post-harvest agricultural product and measurements of environmental conditions associated with the phytosanitary treatment and add the phytosanitary certificate to the blockchain.

10. The apparatus of claim 9 wherein at least one of the blockchain members is configured to generate a tracking code to which the blockchain members are responsive to provide authentication of the phytosanitary treatment.

11. A method comprising:
    detecting measurements of environmental conditions associated with a phytosanitary treatment of a post-harvest agricultural product;
    detecting information that identifies the post-harvest agricultural product;
    maintaining a blockchain of phytosanitary certificates that are treatment records comprising matching pairs of other measurements of environmental conditions associated with other phytosanitary treatments and other identifications of post-harvest agricultural products that were treated; and
    adding a phytosanitary certificate generated from the detected measurements of environmental conditions associated with the phytosanitary treatment and the detected information that identifies the post-harvest agricultural product to the blockchain.

12. The method of claim 11 comprising using private key encryption and a digital signature for primary authentication of the detected measurements of environmental conditions associated with the phytosanitary treatment and the detected information that identifies the post-harvest agricultural product.

13. The method of claim 11 comprising associating a timestamp with each detected measurement.

14. The method of claim 11 comprising associating a geolocation with each detected measurement.

15. The method of claim 11 comprising associating a timestamp with the information that identifies the post-harvest agricultural product.

16. The method of claim 11 comprising associating a geolocation with the information that identifies the post-harvest agricultural product.

17. The method of claim 11 comprising a treatment sensor and an identification sensor using private key encryption for sending a digital signature and encrypted, timestamped, geolocation-stamped information that identifies the post-harvest agricultural product and the measurements of environmental conditions associated with the phytosanitary treatment and comprising blockchain members using the digital signature for primary authentication.

18. The method of claim 17 comprising the blockchain members matching the information that identifies the post-harvest agricultural product with the measurements of environmental conditions associated with the phytosanitary treatment based on timestamps and geolocation-stamps.

19. The method of claim 18 comprising the blockchain members creating a phytosanitary certificate from the matched information that identifies the post-harvest agricultural product and measurements of environmental conditions associated with the phytosanitary treatment and adding the phytosanitary certificate to a phytosanitary certificate blockchain which is an acknowledgement that the required fumigation concentrations are achieved and therefore the process is traceable for compliance.

20. The method of claim 19 comprising at least one of the blockchain members generating a tracking code to which the blockchain members respond by providing authentication of the phytosanitary treatment.

* * * * *